US010477830B2

(12) United States Patent
Earls

(10) Patent No.: US 10,477,830 B2
(45) Date of Patent: Nov. 19, 2019

(54) FLEXIBLE NECKRAIL COUPLING

(71) Applicant: Michael Earls, Athenry (IE)

(72) Inventor: Michael Earls, Athenry (IE)

(73) Assignee: Michael Earls, Athenry (IE)

( * ) Notice: Subject to any disclaimer, the term of this patent is extended or adjusted under 35 U.S.C. 154(b) by 21 days.

(21) Appl. No.: 15/234,039

(22) Filed: Aug. 11, 2016

(65) Prior Publication Data

US 2017/0055483 A1   Mar. 2, 2017

(30) Foreign Application Priority Data

Aug. 25, 2015   (EP) ..................... 15182426

(51) Int. Cl.
| | |
|---|---|
| *A01K 1/00* | (2006.01) |
| *F16B 7/04* | (2006.01) |
| *F16B 2/22* | (2006.01) |
| *F16B 5/06* | (2006.01) |

(52) U.S. Cl.
CPC .......... *A01K 1/0011* (2013.01); *F16B 7/0493* (2013.01); *F16B 2/22* (2013.01); *F16B 5/0685* (2013.01)

(58) Field of Classification Search
CPC ............. Y10T 403/39; Y10T 403/3906; Y10T 403/7171; Y10T 403/7176; Y10T 403/7194; A01K 1/0011; F16B 7/048; F16B 7/0493; F16L 3/085; F16L 3/137
USPC .......................... 403/187, 188, 396, 397, 400
See application file for complete search history.

(56) References Cited

U.S. PATENT DOCUMENTS

| | | | | | |
|---|---|---|---|---|---|
| 2,523,785 | A | * | 9/1950 | Paolo Sereno ...... | A63H 33/102 248/229.26 |
| 3,221,439 | A | * | 12/1965 | Schaper ............... | A63H 33/102 403/169 |
| 4,591,285 | A | * | 5/1986 | Nelson .................... | E05B 79/12 403/11 |
| 5,094,578 | A | * | 3/1992 | Light ....................... | F16B 2/10 248/74.5 |
| 5,111,770 | A | * | 5/1992 | Weelink ............... | A01K 1/0011 119/523 |
| 5,277,387 | A | * | 1/1994 | Lewis ................... | F16L 3/1041 24/482 |

(Continued)

FOREIGN PATENT DOCUMENTS

| | | |
|---|---|---|
| DE | 9100405.5 | 5/1991 |
| DE | 29702098 U1 | 5/1997 |

(Continued)

OTHER PUBLICATIONS

European Search Report and Examination for Application No. EP 15 18 2426 completed Oct. 29, 2015.

*Primary Examiner* — Daniel J Wiley
(74) *Attorney, Agent, or Firm* — Warner Norcross + Judd LLP

(57) ABSTRACT

A coupling component for an animal cubicle that includes an engagement member, a pipe collar transverse to the engagement member for receiving a neckrail, a flexible member that extends in opposite directions from the engagement member and connects the engagement member to the pipe collar so that the flexible member encircles a space adjacent the pipe collar. The deformation of the flexible member allows relative movement between the engagement member and the pipe collar.

16 Claims, 5 Drawing Sheets

(56) References Cited

U.S. PATENT DOCUMENTS

| | | | | |
|---|---|---|---|---|
| 5,371,991 A | * | 12/1994 | Bechtel | E04C 5/167 24/336 |
| 6,390,721 B1 | * | 5/2002 | Wilson, II | F16B 7/0486 403/234 |
| 6,698,964 B2 | * | 3/2004 | DaSilveira | A01K 1/00 119/516 |
| 6,978,973 B1 | * | 12/2005 | Gretz | F16L 3/1203 248/74.1 |
| 7,191,988 B2 | * | 3/2007 | Kim | F16L 3/085 248/229.2 |
| 7,241,071 B2 | * | 7/2007 | Carraher | E04C 5/163 403/164 |
| 7,469,515 B2 | * | 12/2008 | Minor | E04C 5/167 403/397 |
| 8,162,557 B2 | * | 4/2012 | Van Zile, III | B25J 15/0052 403/385 |
| 8,579,539 B2 | * | 11/2013 | Finn | A01K 1/0011 119/523 |
| 2008/0216761 A1 | * | 9/2008 | Fransen | A01K 1/0011 119/502 |

FOREIGN PATENT DOCUMENTS

| | | |
|---|---|---|
| DE | 19547372 A1 | 7/1997 |
| EP | 1579760 A3 | 2/2006 |
| GB | 785300 | 10/1957 |
| WO | 0144671 A1 | 6/2001 |

\* cited by examiner

FLEXIBLE NECKRAIL COUPLING

TECHNICAL FIELD

The present application relates to stalls or cubicles for animals.

BACKGROUND ART

Cattle are frequently accommodated indoors using cubicle (also referred to as stalls or pens; the term "cubicles" will be used herein). One common design of a cubicle has a common head barrier or wall with parallel dividers projecting out to define individual spaces for animals between a pair of adjacent dividers.

Typical cubicle dividers are a basic U shape made of one piece of steel tubing or pipe bent to make the U shape. The ends of the "U" are mounted to the head end barrier (i.e. with the "U" lying on its side) and with the bottom of the "U" projecting outwards.

A lengthwise head-end rail, known as a neckrail, is tied to the top of the "U" shape by a series of steel neckrail clamp brackets, such that the neckrail runs along the head-end of each row of cubicles. (As used herein the term "head-end" refers to the opposite end of a cubicle to the "open end" into which the animal enters a cubicle.) The neckrail is typically one piece of steel tubing that spans a plurality of cubicles.

The purpose of the neckrail is to ensure that the cubicle bed is kept clean. The cows will not lie down too far forward if the neck rail is positioned correctly and they will also position themselves correctly while standing without dunging on the bedding.

The lying down behaviour of cows requires enough space so that it can be carried out in a normal way. The head and body of a fully developed cow are thrust forward 0.6-0.7 meters during the lying down process. When the cow wants to get up in a natural way it first rises to its knees and afterwards the hind part of its body is swung up via its knees, which function as a rocking point. That is, the cow moves forward, or lunges, as she gets to her feet.

The position of the neckrail, which spans two side tubes of the cubicle, is critical to allow the cow sufficient room when she gets to her feet. The problem with positioning the neckrail to provide lunging space is that too much space can result in the cow simply walking through the cubicle or at least moving too far forward while standing. Too little room and the chances of a cow injuring her head or neck on the neckrail when getting to her feet are greatly increased.

Some efforts have been made to address this problem. For example, flexible neck rails, like coated chains or flexible rubber piping have been provided in place of the typical steel tubing/piping neck rail.

Alternatives to the standard steel neckrail clamp brackets have also been provided. For example, there are currently U Bolt type Coupling systems in use that allow the steel neckrail tubing to move upwards when contacted by a cow's neck or head. That is, when getting to its feet, a cow may push the neckrail upwards within the coupling system. When the cow no longer makes contact with the neckrail, it freefalls back into position causing a load bang which can unsettle the animals.

EP 1 579 760 relates to a cubicle for an animal with a front short side forming the entrance for the animal to the cubicle, with lateral partitions extending at the two long sides of the cubicle, with a rear partition for limiting the animal's movement in the direction of the rear short side of the cubicle, and with a support element for fastening the lateral partitions.

DE 297 02 098 relates to a cubicle separation for stables of livestock, particularly cattle, consisting of an upright, like a wing against the force of a restoring elastic member pivotally mounted frame part with an attached thereto blade.

DE 195 47 372 relates to a partitioning component mounted at one end on a fixed point between two stalls and clear of the floor for a distance equal to between one-third and two-thirds of the height of a cow.

WO 01/44671 relates to a one-piece, unitary clamp for a longitudinally extending structural member, such as a tube, is provided which can be mounted to a mounting surface such that the structural member received in the clamp is either parallel to or perpendicular to the mounting surface.

DE 91 00 405 relates to cubicles for cows consisting of separating frame and transverse to these extending header tubes, spring guards and movable neck tie tubes.

SUMMARY

In a first aspect there is provided a coupling component for an animal cubicle, comprising an engagement member, a pipe collar transverse to the engagement member for receiving a neckrail, a flexible member extending in opposite directions from the engagement member and connecting the engagement member to the pipe collar such that the flexible member encircles a space adjacent the pipe collar, wherein deformation of the flexible member allows relative movement between the engagement member and the pipe collar.

Having the flexible member drastically improves animal safety and comfort in that the flexibility of the coupling component allows the animal to move the neckrail when they make contact with it thus avoiding injury, preventing the animal from panicking. It eliminates the restrictive nature of the traditional neckrail in the cubicle by contributing the freedom of the animal in the cubicle.

Advantageously the flexible member connects the top of the engagement member to the sides of the pipe collar. Having the flexible member so connected allows a large degree of relative motion between the engagement member and the pipe collar.

The flexible member may connect to opposite sides of the pipe collar. This ensure maximum flexibility i.e., the pipe collar can move evenly in all directions.

The flexible member may form a loop connecting the top of the engagement member to the sides or top of the pipe collar. This ensures that the pipe collar can easily move in all directions. The loop may be symmetrical extending from the engagement member.

Advantageously, the coupling member further comprises at least one protrusion extending from the flexible member within the space adjacent the pipe collar, wherein deformation of the flexible member causes a distal end of the at least one protrusion to contact the flexible member.

The protrusions help the coupling component to re-centre the pipe collar (receiving the neckrail) to its original position after the flexible member has been stretched and released. That is, if relative movement occurs between the engagement member and the pipe collar, the pipe collar holding the neckrail is guided back into its original position by the protrusions.

Advantageously, the protrusion(s) extends from an area adjacent the top of the engagement member. This positioning of the protrusions ensures that they perform efficiently to guide the pipe collar back into position as well as prevent over extension of the flexible member.

Advantageously, the protrusions curve at least partially around the pipe collar. This positioning of the protrusions helps to restrict the movement or stretch of the flexible member as the animal pushes it. That is, as the pipe collar is pulled or pushed away from the engagement member, the positioning of the protrusions ensures that the walls of the flexible member contact the protrusions. The protrusions resist further stretching or pulling of the flexible member. The further an animal pushes or pulls the neck rail, the greater the resistance applied by the protrusions to the flexible member.

Advantageously, the flexible member connects the engagement member to the pipe collar such that the engagement member is spaced apart from the pipe collar. The void or space between the engagement member and the pipe collar allows a spacer to be inserted between these elements. Different countries require the neckrail to be at a specific height from the ground. By adjusting the distance between the pipe collar and engagement member, the height of the neckrail can be adjusted.

The aforementioned engagement member may be a plate for attachment to a wall or partition. In such a configuration, the flexible coupling component is suitable for attachment to the end of neckrail where it meets a wall or partition.

Advantageously, the engagement member may be a pipe collar for receiving a pipe of the cubicle. This configuration allows the neckrail to be connected to a cubicle along a row of cubicles.

At least the flexible member is composed of an elastomeric material. The elastomeric material allows the flexible member to be deformed. In addition, the flexible member composed of elastomeric material naturally returns to its original position after deformation.

The coupling component may be integrally formed of an elastomeric material. In particular, having the engagement member, protrusions and pipe collar formed of elastomeric material ensures minimises sound generation. That is, the rubber surfaces/walls creates a flexible coupling component that prevents noise when the neckrail pipe is raised to its upper limit by the animal and then falls back into its original position.

There is also provided an animal cubicle assembly comprising the coupling component as previously described, a cubicle pipe and a neck rail, wherein the engagement member of the coupling component receives the cubicle pipe and the pipe collar receives the neckrail such that the coupling component connects the cubicle pipe and the neckrail.

This configuration provides an animal cubicle assembly that is more comfortable than those of the prior art in that the animal will not be stressed by making contact with a neckrail when getting to their feet. The flexible component will deform to allow movement of the neckrail if contacted by an animal. The neckrail will subsequently return to its resting position.

BRIEF DESCRIPTION OF THE DRAWINGS

The invention will be further illustrated by the following description of embodiments thereof, given by way of example only with reference to the accompanying drawings, in which.

DETAILED DESCRIPTION OF THE DRAWINGS

Figure 1:
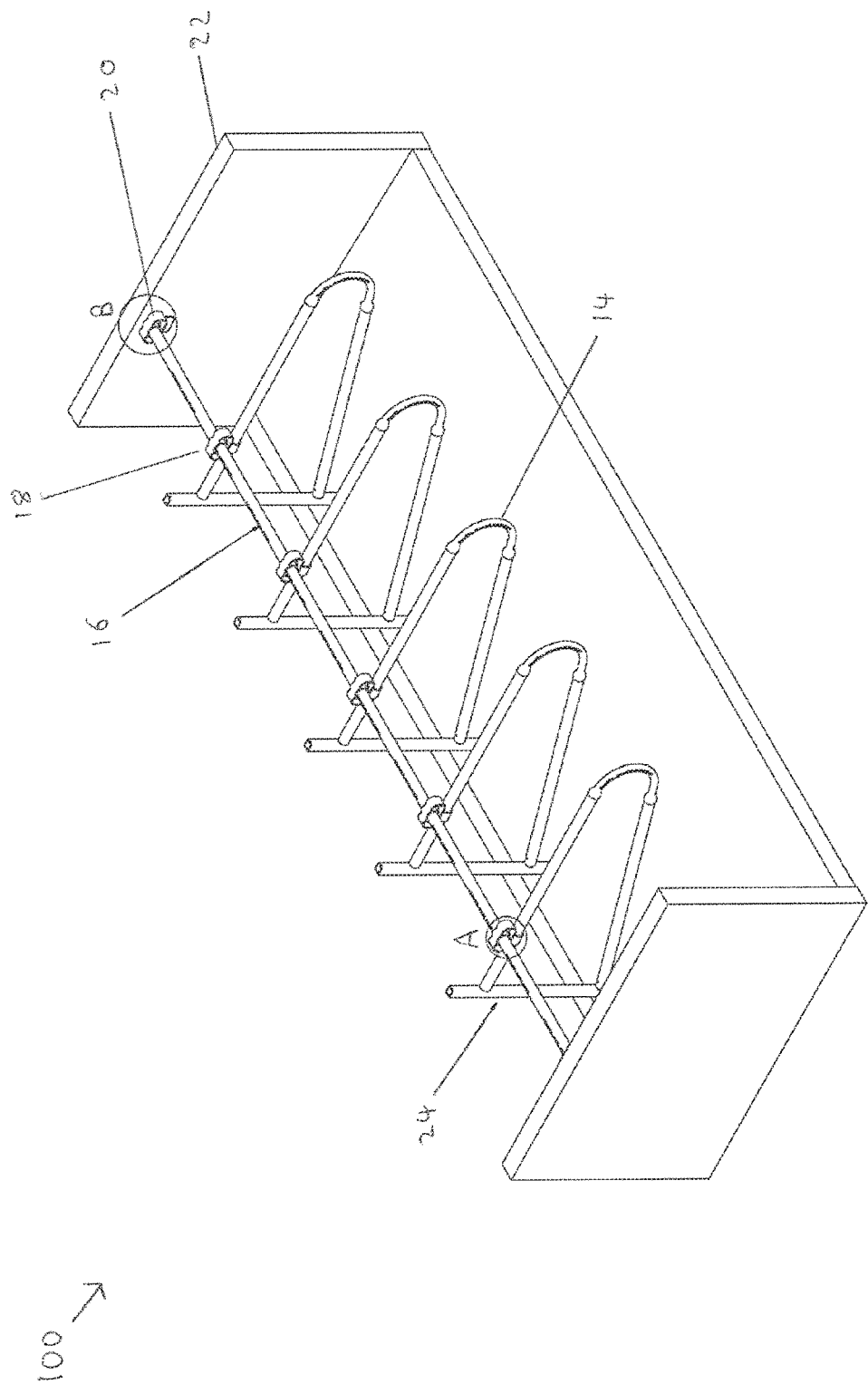
FIG. 1 is a perspective view of a layout of an animal house containing a set of cubicles.

In FIG. 1 there is indicated, generally at 100, an animal house layout containing an animal cubicle assembly 12 with a plurality of animal cubicle barriers 14 arranged in a row. The cubicle barriers 14 are each connected to a neckrail 16. In particular, a flexible coupling component 18 is used to connect each cubicle barrier 14 to the neckrail 16. Another configuration of the coupling component 20 is used to connect the neckrail 16 to an end wall or partition 22. In the embodiment shown in FIG. 1, the neckrail is a hollow plastic pipe. However, the neckrail is not limited to a plastic pipe and does not have to be hollow. Could be Metal, Wood, Fiberglass or a composite material that full fills its structural requirement.

As can be seen from FIG. 1, a series of cubicle posts 24 mounted along a line are used to each mount a cubicle barrier 14. The specific mounting configuration used can be chosen as appropriate by those skilled in the art. In addition, the shape of the cubicle barriers is not restricted to the U shape shown in FIG. 1. Rather any cubicle barrier shape can be used with the coupling component 18 in accordance with the present teachings. However, the cubicle barrier must include a pipe or component to which the coupling component can attach.

Figure 2:
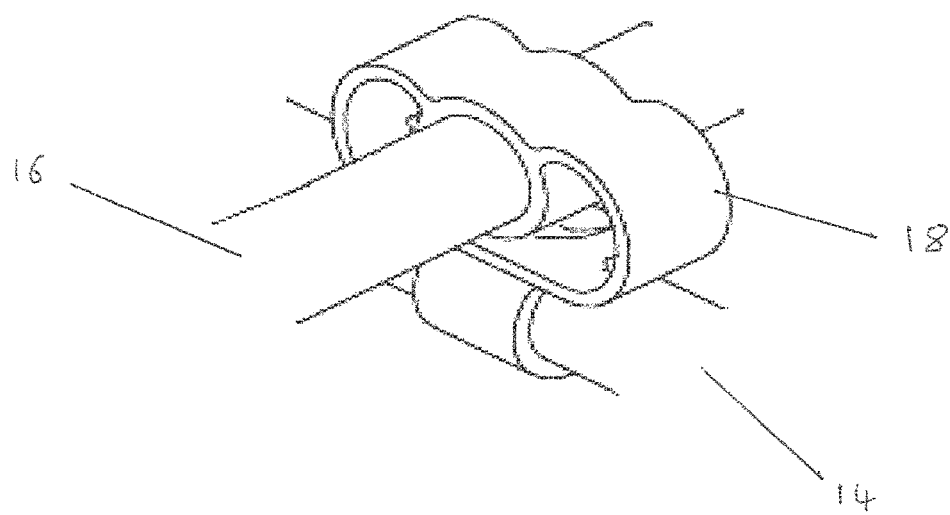
FIG. 2 is a detail of FIG. 1.

Referring additionally to FIG. 2, a detail of the animal cubicle assembly 12 labelled "A" in FIG. 1 is shown. Specifically, FIG. 2 shows the coupling component 18 connecting the cubicle barrier 14 to the neckrail 16. In FIG. 2, the coupling component is in its natural or resting shape i.e., the shape it will return to unless a deforming force is being applied to it. In its resting shape, the coupling component 18 holds the neck rail 16 a certain distance above the cubicle barrier. It is important that the neckrail return to its resting position as this position is specifically chosen. As previously mentioned, if the neckrail is too far forward or too high, a cow can move too far forward in the cubicle. If the neckrail is too low or too far back, a cow cannot fully enter the cubicle or at the least will be uncomfortable when doing so. Therefore, the return of the neck rail to the optimal chosen position (resting position) ensures correct repositioning of the neckrail.

Figure 3:
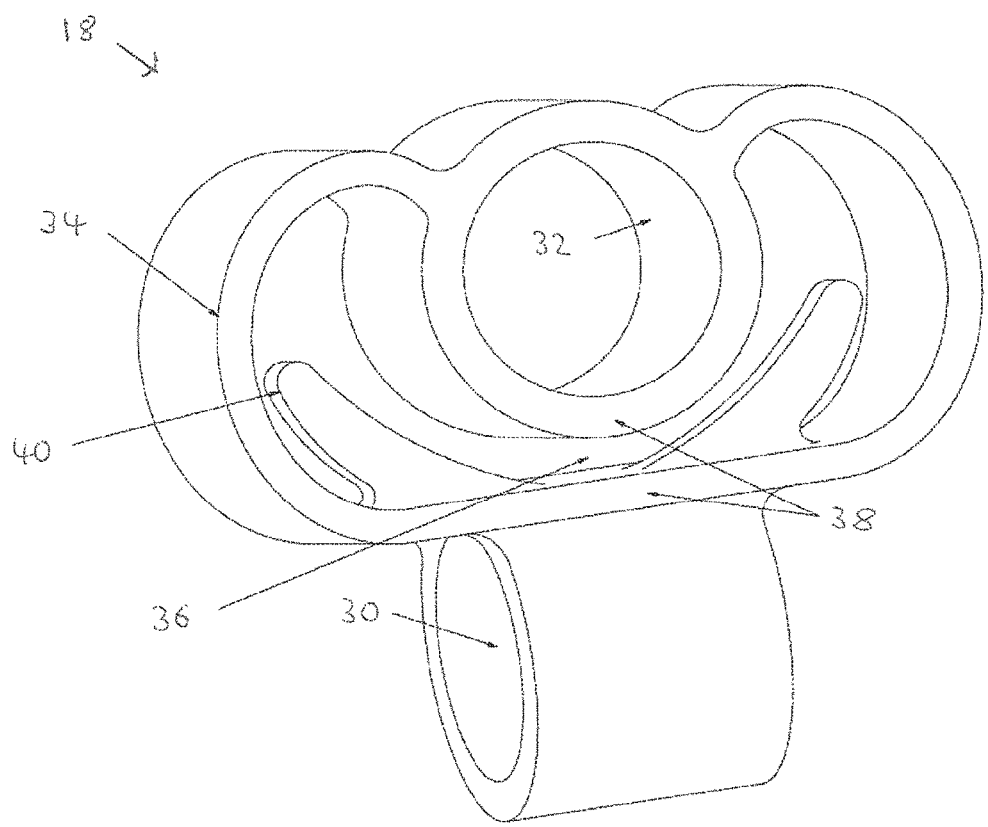
FIG. 3 is a perspective view of the flexible neckrail coupling of FIG. 2.

Turning to FIG. 3, a perspective view of the coupling component 18 is shown without the cubicle barrier or neckrail. From this view, it can be seen that the coupling component 18 includes an engagement member 30, which in the present embodiment is a pipe collar. The engagement member 30 receives the previously described barrier component 14, specifically a pipe of the barrier component 14. A pipe collar 32 is positioned transverse to the engagement member 30. This pipe collar 32 receives the previously described neckrail 16.

A flexible member 34 connects the engagement member 30 to the pipe collar 32 such that the flexible member encircles a space adjacent the pipe collar 32. Deformation of the flexible member 34 allows relative movement between the engagement member and the pipe collar. Specifically, the flexible member 34 or loop section allows the pipe collar 32 to be pulled away from the engagement member 30.

A void or space 36 is provided between the top of the engagement member 30 and the bottom of the pipe collar 32. However, in an alternative configuration, the pope collar 32 may be in contact with the top of the engagement member. The space 36 allows a spacer to be placed therein for the different countries that require the neckrail to be at a specific height from the ground. That is, a piece of rubber can be placed in the space 36 between the pipe collar 32 and the engagement member 30 to increase the distance between the pipe collar 32 and engagement member 30. Alternatively, the flexible coupling component could be integrally manufactured with a spacer in the void 36. In such a configuration, the spacer is in contact with the pipe collar 32 and engagement member 30.

The flexible coupling component 18 is preferably rubber e.g., an elastomeric material. At the very least the flexible member 34 is manufactured from rubber. However, providing rubber walls 38 for the pipe collar 32, flexible member 34 and engagement member 30 is also advantageous. Such rubber walls create a coupling component 18 that prevents noise when the neckrail pipe is raised to its upper limit by the animal and then falls back into its original or resting position. That is, the rubber walls 38 act as shock and sound absorbers. Metal on metal contact does not occur.

Referring again to FIG. 3, it can be seen that protrusions or lugs 40 extend from an area adjacent the top of the engagement member 30. However, the protrusions can extend from any part of the flexible member 34 or from the pipe collar 32 within the space between the flexible member 34 and the pipe collar 32. The protrusions 40 are particularly advantageous as will be explained in more detail.

Figure 4:
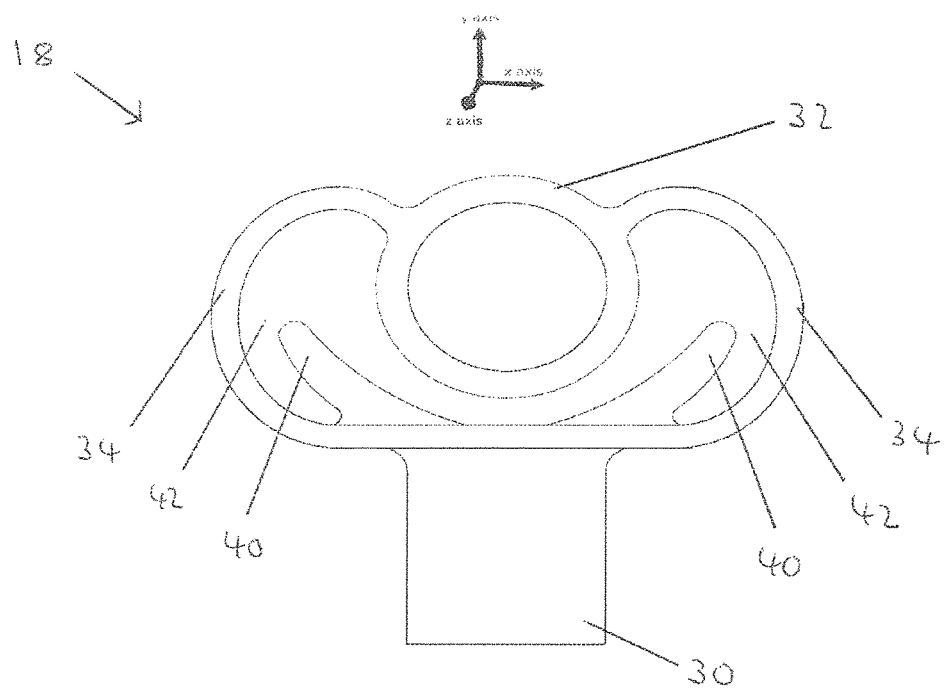
FIG. 4 is a front view of the neckrail coupling of FIG. 3.

Turning to FIG. 4, a front view of the neckrail coupling component 18 in accordance with the first embodiment is shown. From this view, it can be seen that the protrusions 40 extend from the flexible member 34 and occupy a portion of the space between the flexible member 34 and the pipe collar 32. In use, the pipe collar 32 receives and holds a neckrail. If an animal makes contact with the underside of the neckrail, the neckrail and pipe collar 32 are pushed in an arc in the direction of the x y plane shown in FIG. 4. There will be little or no movement in the z-plane. As the pipe collar 32 (and neckrail held therein) is pushed in an arc, the curved flexible member 34 straightens and is eventually brought into contact with the protrusions 40. In FIG. 4, the coupling component 18 is in its resting state and a gap or space 42 exists between the protrusions 40 and the internal wall of the flexible member 34. However, as the pipe collar 32 is pulled away from the engagement member 30, the flexible member is deformed and the gap 42 closes. Eventually, the protrusions contact the walls of the flexible member 34 and inhibit any further deformation of the flexible member. Essentially, deformation of the flexible member causes a distal end of each protrusion to contact the flexible member, which prevents further deformation of the flexible member 34.

In the embodiment in accordance with FIG. 4, the protrusions extend from an area adjacent the top of the engagement member. However, the protrusions may be positioned at any area on the surface wall of the flexible member 34. Furthermore, the protrusions 40 may extend from the pipe collar 32 towards the flexible member 34 within the aforementioned space. As long as the protrusions make contact with a portion of the flexible member or the pipe collar 32 when the pipe collar moves away from the engagement member 30, the protrusions 40 should function to inhibit deformation (or over extension) of the flexible member 34.

Figure 5:
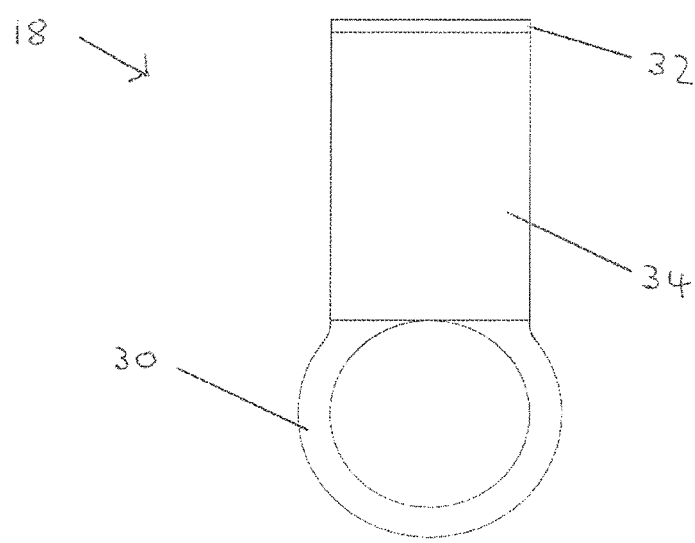
FIG. 5 is a side view of the neckrail coupling of FIG. 3.

Turning to FIG. 5, a side view of the neckrail coupling of FIG. 3 is shown. From this view, the transverse arrangement of the pipe engagement member 30 relative to the pipe collar 32 can be seen. It can also be observed that the flexible member 34 is the same width as the pipe collar 32. However, the coupling component 18 is not limited to this configuration and the flexible member 34 may be any width as long as it is sufficiently strong to support the pipe collar 32 and deform when a force is applied thereto.

Figure 6:
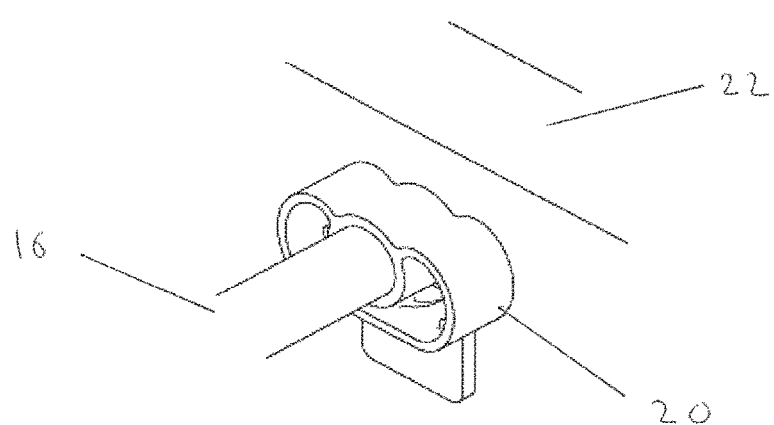
FIG. 6 is a detail of FIG. 1.

FIG. 6 is a detail of FIG. 1, specifically a detail of the animal cubicle assembly 12 labelled "B" in FIG. 1 is shown. In particular, another embodiment of the flexible coupling component 20 is provided. This embodiment of the flexible coupling component 20 is suitable for attachment to the end of a neckrail. That is, the coupling component 20 attaches to a wall or partition 22 (instead of a cubicle barrier 14) as well as the end section of the neckrail.

Figure 7:
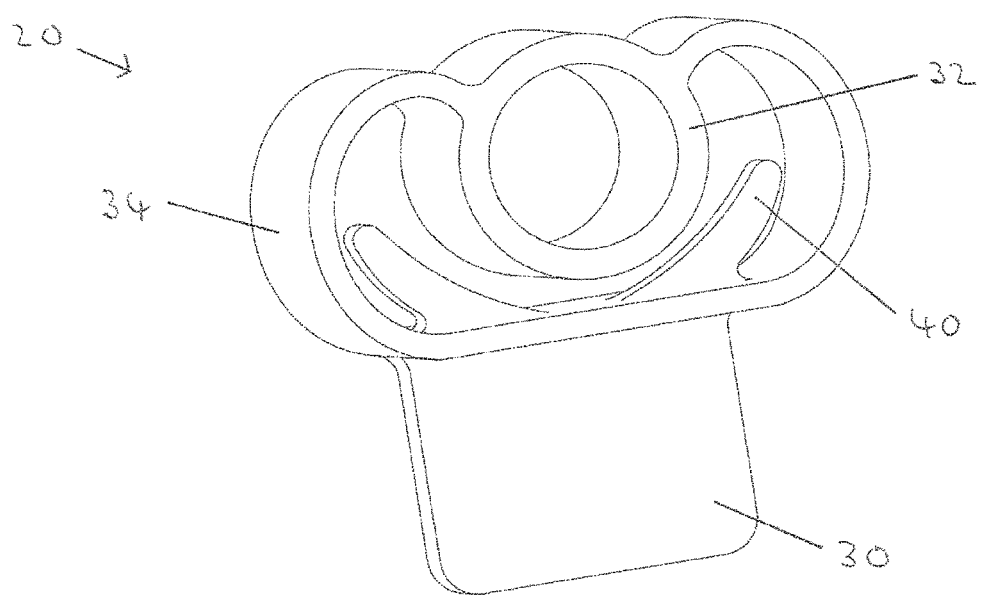
FIG. 7 is a perspective view of the flexible neckrail coupling of FIG. 6.

With reference to FIG. 7, it can be seen that the configuration of this embodiment of the coupling component 20 is quite similar to the previously described embodiment. However, the engagement member 30 in this embodiment is a flat plate. This plate may include holes for bolting to a wall or partition. A number of attachment techniques known to those skilled in the art may be used to attach the plate to a wall or partition 22. The plate may be metal or an elastomeric material.

Figure 8:
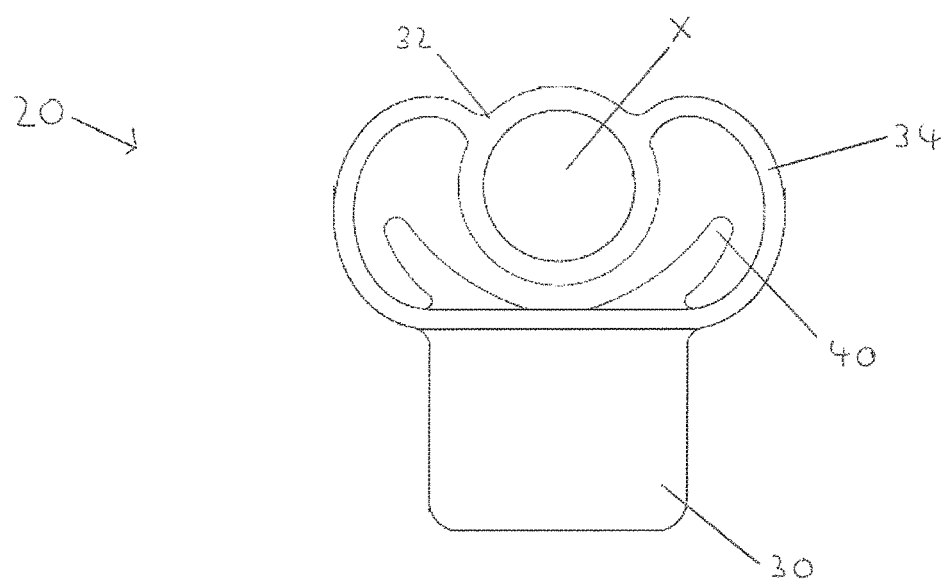
FIG. 8 is a front view of the neckrail coupling of FIG. 7.

With reference to FIG. 8, the coupling component 20 functions in a similar manner as previously described with regard to the first embodiment of the coupling component 18. That is, the flexible member 34 deforms if the pipe collar 32 is pulled away from the engagement member 30. This allows the neckrail 16 to act as a flexible neckrail.

It can be seen that the pipe collar 32 is open in the coupling component 20 of FIG. 8. That is, the neckrail 16 can slide through the pipe collar 32. However, another wall can be provided at side X in the pipe collar 32. In such a configuration, the pipe collar 32 is only open at one end. That is, the neckrail can only be inserted from one side. However, the further wall at side X prevents the neckrail 16 from making contact with the wall or partition 22. This results in noise reduction as the neckrail 16 cannot not scrape or bang against the wall 22 when being raised or lowered/dropped.

Figure 9:
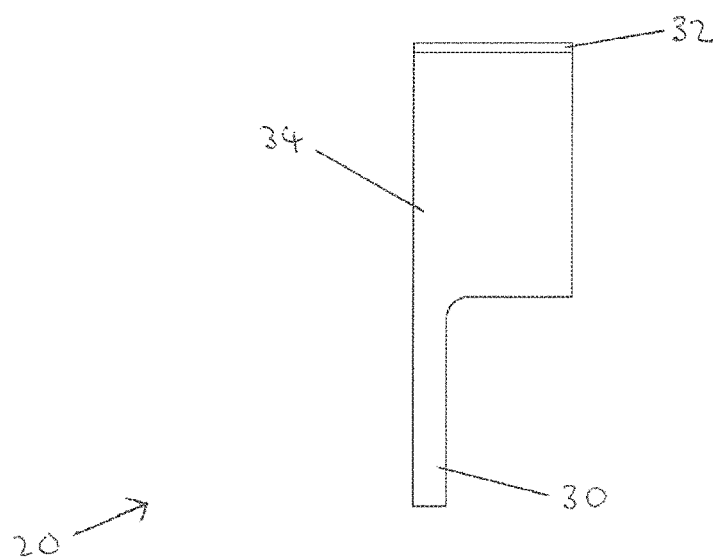
FIG. 9 is a side view of the neckrail coupling of FIG. 7

FIG. 9 shows a side view of the coupling component 20. The engagement member 30 (plate or flange) is clearly much thinner than the pipe collar 32. However, the engagement member can be of any thickness as long as it is sufficiently strong to hold the coupling component 20 in place.

It should be noted that although the shape of the pipe collars described herein is circular, they may be of any shape to match the shape of the pipes held therein, e.g., square, triangular etc.

The invention is not limited to the embodiment(s) described herein but can be amended or modified without departing from the scope of the present invention.

The invention claimed is:

1. A coupling component for an animal cubicle, comprising:
    an engagement member;
    a first closed pipe collar transverse to the engagement member for holding a neckrail in contact thereto;
    a flexible member extending in opposite directions from the engagement member and connecting the engagement member to the pipe collar such that the flexible member encircles a space adjacent the pipe collar;

wherein deformation of the flexible member allows relative movement between the engagement member and the first closed pipe collar such that the first closed pipe collar holds the neckrail in contact thereto during the relative movement.

2. The coupling component of claim 1 wherein the flexible member connects the top of the engagement member to the sides of the pipe collar.

3. The coupling component of claim 2, further comprising at least one protrusion extending from the flexible member within the space, wherein deformation of the flexible member causes a distal end of the at least one protrusion to contact the flexible member.

4. The coupling component of claim 1 further comprising at least one protrusion extending from the flexible member within the space, wherein deformation of the flexible member causes a distal end of the at least one protrusion to contact the flexible member.

5. The coupling component of claim 4 wherein the at least one protrusion extends from an area adjacent the top of the engagement member.

6. The coupling component of claim 5, wherein the at least one protrusion curves at least partially around the pipe collar.

7. The coupling component of claim 4 wherein the at least one protrusion curves at least partially around the pipe collar.

8. The coupling component of claim 1 further comprising at least one protrusion extending from the flexible member within the space, wherein deformation of the flexible member causes a distal end of the at least one protrusion to contact the flexible member.

9. The coupling component of claim 8, wherein the flexible member connects the engagement member to the pipe collar such that the engagement member is spaced apart from the pipe collar.

10. The coupling component of claim 1 wherein the flexible member connects the engagement member to the pipe collar such that the engagement member is spaced apart from the pipe collar.

11. The coupling component of claim 10, where the engagement member is a second pipe collar, different from the first pipe collar, for receiving a pipe of the cubicle.

12. An animal cubicle assembly comprising the coupling component of claim 11, a cubicle pipe and a neck rail, wherein the engagement member of the coupling component receives the cubicle pipe and the pipe collar receives the neckrail such that the coupling component connects the cubicle pipe and the neckrail.

13. The coupling component of claim 1 where the engagement member is a second pipe collar, different from the first collar, for receiving a pipe of the cubicle.

14. The coupling component of claim 1 wherein at least the flexible member is composed of an elastomeric material.

15. The coupling component of claim 1 wherein the coupling component is integrally formed of an elastomeric material.

16. An animal cubicle assembly comprising the coupling component of claim 1, a cubicle pipe and a neck rail, wherein the engagement member of the coupling component receives the cubicle pipe and the pipe collar receives the neckrail such that the coupling component connects the cubicle pipe and the neckrail.

* * * * *